United States Patent
Mahidhara et al.

(10) Patent No.: US 9,794,731 B2
(45) Date of Patent: Oct. 17, 2017

(54) METHOD AND APPARATUS FOR PROVIDING SECURE COMMUNICATION IN A SELF-ORGANIZING NETWORK

(75) Inventors: Shravan Mahidhara, Palatine, IL (US); Vasanthi Raghuram, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 590 days.

(21) Appl. No.: 13/012,057

(22) Filed: Jan. 24, 2011

(65) Prior Publication Data

US 2012/0173875 A1 Jul. 5, 2012

Related U.S. Application Data

(60) Provisional application No. 61/429,001, filed on Dec. 31, 2010.

(51) Int. Cl.
*H04L 9/32* (2006.01)
*H04W 4/00* (2009.01)
(Continued)

(52) U.S. Cl.
CPC ......... *H04W 4/008* (2013.01); *H04L 63/0428* (2013.01); *H04L 63/08* (2013.01);
(Continued)

(58) Field of Classification Search
CPC ... H04L 63/205; H04L 63/102; H04L 67/303; H04L 41/0886; H04L 63/0428;
(Continued)

(56) References Cited

U.S. PATENT DOCUMENTS 7,342,906 B1 3/2008 Calhoun
7,596,368 B2 9/2009 Yamada et al.
(Continued)

FOREIGN PATENT DOCUMENTS

WO 2007001953 A1 1/2007

OTHER PUBLICATIONS

Kaufman et al, RFC 5996—Internet Key Exchange Protocol Version 2 (IKEv2), Sep. 2010, IETF, pp. 1-139.*
(Continued)

*Primary Examiner* — Linglan Edwards
*Assistant Examiner* — Forrest Carey
(74) *Attorney, Agent, or Firm* — Fish & Richardson P.C.

(57) ABSTRACT

A communication system provides secure communication between two nodes in a self-organizing network without the need for a centralized security or control device. A first node of the two nodes is provisioned with one or more security profiles, auto-discovers a second node of the two nodes, authenticates the second node based on a security profile of the one or more security profiles, selects a security profile of the one or more security profiles to encrypt a communication session between the two nodes, and encrypts the communication session between the two nodes based on the selected security profile. The second node also is provisioned with the same one or more security profiles, authenticates the first node based on a same security profile as is used to authenticate the second node, and encrypts the communication session based on the same security profile as is used for encryption by the first node.

20 Claims, 2 Drawing Sheets

(51) Int. Cl.
  *H04L 29/06* (2006.01)
  *H04W 28/18* (2009.01)
  *H04W 48/16* (2009.01)
  *H04W 76/00* (2009.01)
  *H04W 84/18* (2009.01)

(52) U.S. Cl.
  CPC ............ *H04W 28/18* (2013.01); *H04W 48/16* (2013.01); *H04W 76/00* (2013.01); *H04W 84/18* (2013.01)

(58) Field of Classification Search
  CPC ...... H04L 63/08; H04W 12/08; H04W 40/24; H04W 4/008; H04W 28/18; H04W 48/16; H04W 76/00; H04W 84/18
  USPC .......................................................... 713/168
  See application file for complete search history.

(56) References Cited

U.S. PATENT DOCUMENTS

| | | | | |
|---|---|---|---|---|
| 2002/0069278 A1* | 6/2002 | Forslow | ........................ | 709/225 |
| 2006/0264227 A1* | 11/2006 | Takahashi et al. | ........... | 455/513 |
| 2008/0086760 A1* | 4/2008 | Jiang et al. | ........................ | 726/3 |
| 2008/0289027 A1* | 11/2008 | Yariv et al. | ...................... | 726/11 |
| 2011/0178933 A1* | 7/2011 | Bailey, Jr. | ............. | G06F 21/564 |
| | | | | 705/71 |
| 2011/0188659 A1* | 8/2011 | Khalid et al. | ................. | 380/278 |

OTHER PUBLICATIONS

Kent, RFC 4303—IP Encapsulating Security Payload (ESP), Dec. 2005, IETF, pp. 1-44.*

3GPP TS 36.300 v8.9.0, "3rd Generation Partnership Project; Technical Specification Group Radio Access Network; Evolved Universal Terrestrial Radio Access (E0UTRA) and Evolved Universal Terrestrial Radio Access Network (E-UTRAN); Overall description; Stage 2 (Release 8)", (Jun. 2009), all pages.

3GPP TR 36.902 v1.2.0, 3rd Generation Partnership Project; Technical Specification Group Radio Access Network; Evolved Universal Terrestrial Radio Access Network (E-UTRAN); Self-configuring and self-optimizing network use cases and solutions (Release 9), (May 2009), all pages.

* cited by examiner

METHOD AND APPARATUS FOR PROVIDING SECURE COMMUNICATION IN A SELF-ORGANIZING NETWORK

CROSS-REFERENCE(S) TO RELATED APPLICATION(S)

The present application claims priority from provisional application Ser. No. 61/429,001, entitled "METHOD AND APPARATUS FOR PROVIDING SECURE COMMUNICATION IN A SELF-ORGANIZING NETWORK," filed Dec. 31, 2010, which is commonly owned and incorporated herein by reference in its entirety.

FIELD OF THE INVENTION

The present invention relates generally to self-organizing networks, and more specifically to security mechanisms for a self-organizing network (SON).

BACKGROUND OF THE INVENTION

Before a communication channel is established between any two nodes in a wireless communication network, the nodes need to mutually authenticate each other and thereafter establish a secure communication channel. Typically, in a pre-configured communication network, secure parameters for authentication and establishment of a secure channel is are assigned based on pre-determined configuration data. However, in a self-organizing network (SON), such as such as a self-configuring and self-optimizing network, where nodes are auto-discovered, each node dynamically learns the existence of the other nodes and, correspondingly, parameters for authentication and establishment of a secure channel cannot be pre-configured.

Nevertheless, node authentication and link security are important to both an "advertising" node and a "discovering" node in a SON to prevent a malicious or unauthorized user from gaining access to the network and the nodes. Accordingly, use of a centralized security server or other centralized control network element that establishes credentials for, and performs, node authentication has been suggested, but this requires additional investment in cellular infrastructure and also reduces the operability of a SON, typically a highly operable network.

Therefore, a need exists for a method and apparatus for distributing security information across a SON without the need to employ a centralized server.

Figure 1:
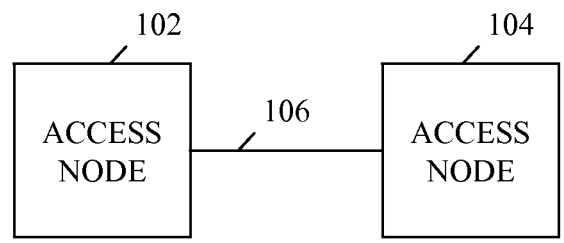
FIG. 1 is a block diagram of a communication system in accordance with various embodiments of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need that exists for a method and apparatus for distributing security information across a self-organizing network (SON) without the need to employ a centralized server, a communication system is provided that provides secure communication between two nodes in a self-organizing network without the need for a centralized security or control device. A first node of the two nodes is provisioned with one or more security profiles, auto-discovers a second node of the two nodes, authenticates the second node based on a security profile of the one or more security profiles, selects a security profile of the one or more security profiles to encrypt a communication session between the two nodes, and encrypts the communication session between the two nodes based on the selected security profile. The second node also is provisioned with the same one or more security profiles, authenticates the first node based on a same security profile as is used to authenticate the second node, and encrypts the communication session based on the same security profile as is used for encryption by the first node.

Generally, an embodiment of the present invention encompasses a method for providing a secure communication in a self-organizing network. The method includes maintaining, at a first network node, one or more security profiles, auto-discovering, by the first network node, a second network node, authenticating, by the first network node, the second network node based on a security profile of the one or more security profiles, selecting a security profile of the one or more security profiles to encrypt a communication session between the first network node and the second network node, and encrypting the communication session between the first network node and the second network node based on the selected security profile.

Another embodiment of the present invention encompasses a network node capable of establishing secure communication in a self-organizing network. The network node comprises at least one memory device that is configured to maintain one or more security profiles. The network node further comprises a processor that is configured to auto-discover another network node, authenticate the second network node based on a security profile of the one or more security profiles, select a security profile of the one or more security profiles to encrypt a communication session between the network node and the another network node, and encrypt the communication session between the network node and the another network node based on the selected security profile.

Yet another embodiment of the present invention encompasses a system for establishing secure communication in a self-organizing network. The system includes a first network node that is configured to maintain one or more security profiles, auto-discover a second network node, authenticate the second network node based on a security profile of the one or more security profiles, select a security profile of the one or more security profiles to encrypt a communication session between the first network node and the second network node, and encrypt the communication session between the first network node and the second network node based on the selected security profile. The system further includes the second network node, wherein the second network node is configured to maintain a same one or more security profiles as the first network node and authenticate the first network node based on a same security profile of the one or more security profiles as the security profile used by the first network node to authenticate the second network node.

Turning now to the drawings, the present invention may be more fully described with reference to FIGS. 1-3. FIG. 1 is a block diagram of a communication system 100 in accordance with various embodiments of the present invention. Communication system 100 is a self-organizing network (SON) 100 that includes multiple access nodes 102, 104 (two shown). Communication system 100 may be any type of network where access nodes, such as access nodes 102 and 104, auto-discover the presence of neighboring access nodes, for example, through known node "advertising" and "discovery" processes, such as a mesh network or any other type of self-configuring and self-optimizing network. Preferably, communication system 100 operates in accordance with the 3GPP LTE (Third generation Partnership Project Long Term Evolution) standards, for example, in accordance with Technical Report (TR) 36.902 which provides protocols for operation of a SON network in a 3GPP LTE communication system. However, communication system 100 may be any type of communication system that supports a SON network, such as but not limited to a NGMN (Next Generation Mobile Networks) communication system, a UMTS (Universal Mobile Telecommunications System) communication system, or a communication system that operates in accordance with any one of the IEEE (Institute of Electrical and Electronics Engineers) 802.xx standards, for example, the 802.11, 802.15, 802.16, or 802.20 standards.

Each access node 102, 104 may be any kind of network element that provides wireless access, either directly or indirectly (via one or more other access nodes, such as in a mesh network), to a network, for other access nodes and/or user terminals within communication range of the access node. Access nodes 102 and 104 also may be referred to herein as network nodes. For example, each access node 102, 104 may be an infrastructure element, such as a base station, an access point, or a Node B, or may be a mobile terminal such as a mobile station, user equipment, or subscriber station. Each access node 102, 104, such as access node 102, communicates with a neighboring access node, such as access node 104, via an intervening communication link 106, which link may be a wireless link, a wireline link, or a combination of a wireless link and a wireline link. Communication link 106 includes one or more signaling links and one or more traffic links and supports an exchange of signaling and an exchange of traffic between access nodes 102 and 104.

Figure 2:
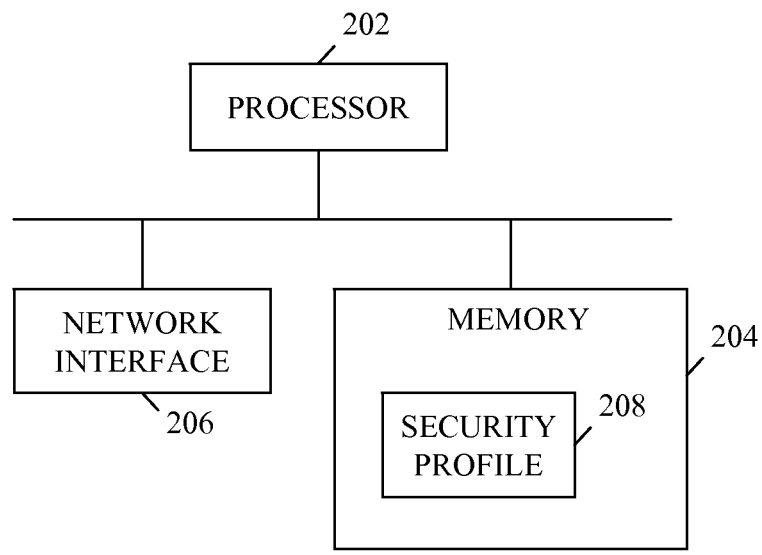
FIG. 2 is a block diagram of an access node of the communication system of FIG. 1 in accordance with an embodiment of the present invention.

FIG. 2 is a block diagram of an access node 200, such as access nodes 102 and 104, in accordance with an embodiment of the present invention. Access node 200 includes a processor 202, such as one or more microprocessors, microcontrollers, digital signal processors (DSPs), customized processors, field programmable gate arrays (FPGAs), or combinations thereof or such other devices known to those having ordinary skill in the art, which processor is configured to execute the functions described herein as being executed by the access node. Access node 200 further includes an at least one memory device 204, such as but are not limited to a hard disk, a CD-ROM, an optical storage device, a magnetic storage device, random access memory (RAM), dynamic random access memory (DRAM), a ROM (Read Only Memory), a PROM (Programmable Read Only Memory), an EPROM (Erasable Programmable Read Only Memory), an EEPROM (Electrically Erasable Programmable Read Only Memory) a Flash memory, or equivalents thereof that is coupled to the processor and that maintains data and programs that may be executed by the associated processor and that allows the access node to perform all functions necessary to operate in communication system 100. For example, at least one memory device 204 may maintain information concerning communication system protocols and a version of each of various types of software supported by the access node, hardware types and types of network interfaces included in the access node, an identifier of the access node such as a base station identifier or a mobile station identifier, an identifier of one or more of a subnet and a domain associated with the access node, such as a subnet identifier or a node FQDN (Fully Qualified Domain Name), an address of the access node, such as an Internet Protocol (IP) address that may be allocated to the access node when it initializes in, or registers with, communication system 100, and identifiers of various ports (for example, port numbers) of the access node.

At least one memory device 204 further maintains a default security profile module 208 that maintains one or more security profiles that are common to both access nodes 102 and 104. Default security profile module 208 may be provisioned to the access node by an operator of communication system 100 at any time prior to the module's utilization to establish a secure link, for example, at the factory, at installation of the access node in the network, at purchase of the node by a user, or via a secure communication between the operator and the access node.

Each security profile includes information utilized to set up a secure link between two access nodes, for example, one or more encryption keys and any other security parameters that may be used to support standardized or proprietary authentication and/or encryption algorithms. Typically, such security parameters are data link layer parameters that are used to perform encryption at the data link layer. However, one of ordinary skill in the art realizes that the present invention applies to any protocol layer that may provide encrypted communications. Default security profile module 208 may further maintain a table or algorithm for use in selecting a security profile, from among multiple security profiles maintained by the module, that will be utilized to secure a communication link. For example, in one such embodiment of the present invention, when default security profile module 208 includes multiple security profiles, default security profile module 208 may include a table of security profiles, which table maintains an association between each security profile and one or more security profile selection parameters. In another such embodiment of the present invention, when default security profile module 208 includes multiple security profiles, default security profile module 208 may include a security profile selection algorithm for selecting a security profile from among the multiple security profiles based on one or more security profile selection parameters, wherein an algorithm output identifies a security profile based on security profile selection parameters input to the algorithm.

Access node 200 further includes at least one network interface module 206 for interfacing with other access nodes via an intervening communication link, such as communication link 106. When the intervening communication link is a wireless communication link, network interface module 206 may include at least one radio frequency (RF) receiver (not shown) and at least one RF transmitter (not shown) for wirelessly receiving signals from, and transmitting signals to, the other access nodes.

Unless otherwise specified herein, the functionality described herein as being performed by access nodes 102 and 104 is implemented with or in software programs and instructions stored in the at least one memory device 204 of the access node and executed by the processor 202 of the access node. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the UE, access node, MME, and MSC. Based on the present disclosure, one skilled in the art will be readily capable of producing and implementing such software and/or hardware without undo experimentation.

Figure 3:
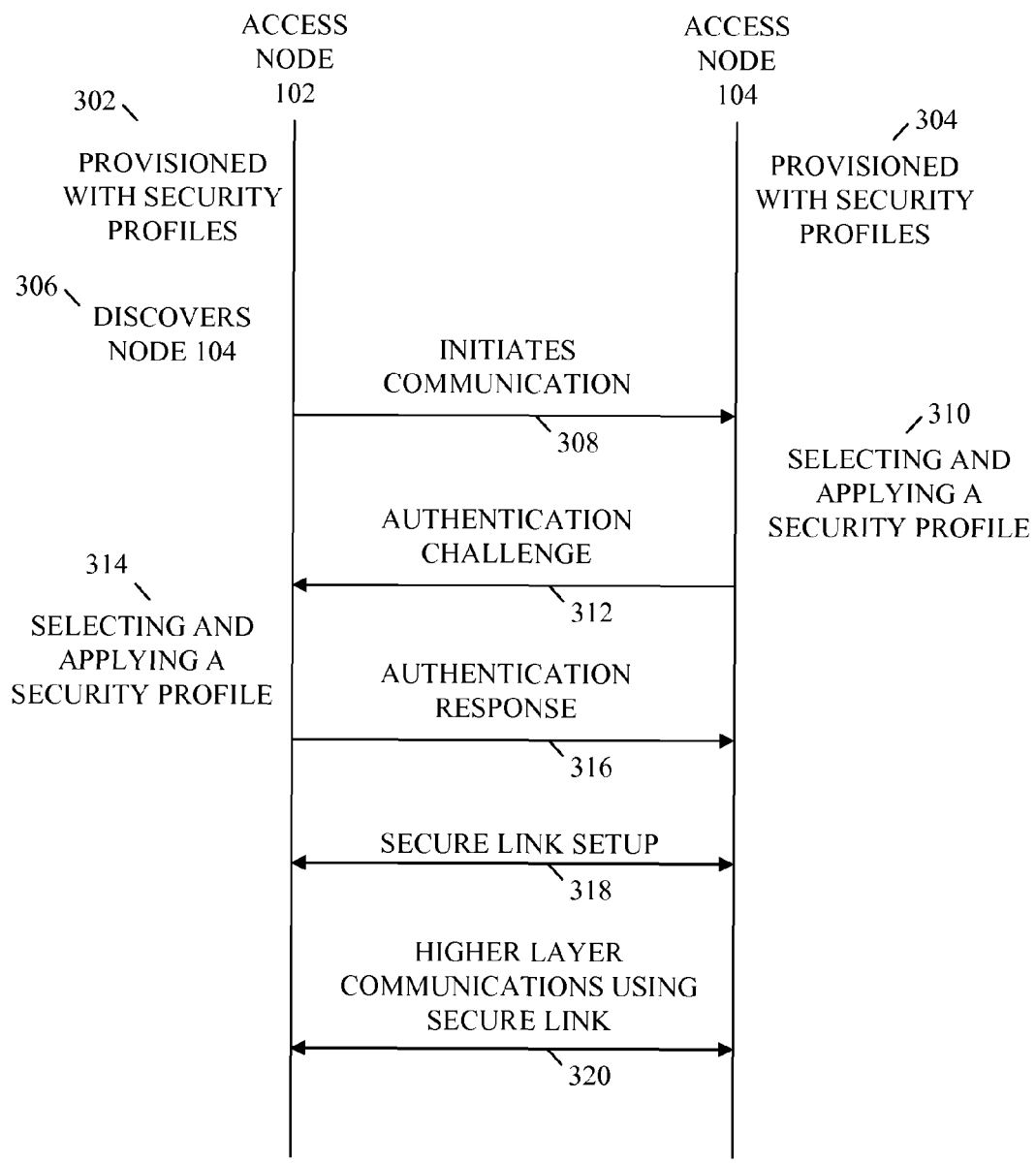
FIG. 3 is a signal flow diagram illustrating a method executed by the communication system of FIG. 1 in securing a communication between two access nodes in accordance with various embodiments of the present invention.

Referring now to FIG. 3, a signal flow diagram 300 is provided that illustrates a method executed by communication system 100 in securing a communication, such as a communication over communication link 106, between two access nodes, that is, access nodes 102 and 104, in accordance with various embodiments of the present invention. Signal flow diagram 300 begins when each of access nodes 102 and 104 is provisioned (302, 304) with default security profile module 208. As described above, the default security profile module 208 may be provisioned to access nodes 102 and 104 at any time prior to the access nodes' attempt establish a secure link between each other. Each access node 102, 104 stores the provisioned default security profile module 208 in the at least one memory device 204 of the access node.

A first access node, for example, access node 102, of the two access nodes 102, 104 then initiates an access node discovery process by which it discovers (306) neighbor access nodes, such as access node 104. As part of the access node discovery process, each of the first and second access nodes 102, 104 discover and store, in the at least one memory device 204 of the access node, an access node identifier associated with the other access node, such as but not limited to a base station identifier, a mobile station identifier, a node FQDN (Fully Qualified Domain Name), a routing address such as an Internet Protocol (IP) address, or a subnet identifier associated with the access nodes.

Many node discovery processes are known in the art and any such node discovery process may be used herein without departing from the spirit and scope of the present invention. For example, the 3GPP LTE standards, and in particular section 22.3 of Technical Specification (TS) 36.300, describe an Automatic Neighbor Relation (ANR) function that provides for a Node B to discover neighboring Node Bs and to build and maintain a table of the neighbor Node Bs, which table includes a cell identifier associated with each of the neighbor Node Bs. By way of another example, PCT International Publication Number WO2007/001953 describes a scheme that utilizes the Internet Control Message Protocol (ICMP), and in particular ICMP Echo packets and ICMP Echo Reply packets, for a sender node to discover addresses of all receiver nodes along a packet route. By way of still other examples, in the realm of mobile ad hoc networks, a variety of routing protocols exist by which a mobile node discovers neighbor mobile nodes. For example, in table-based mobile ad hoc protocols, each mobile node assembles and maintains a routing table comprising routing information for the neighbor mobile nodes, which routing information may be based on "hello" messages broadcast by each such mobile node. By way of another example, in on-demand mobile ad hoc protocols, a source mobile node that requires a route to a destination node initiates a route discovery process by which the source node broadcasts a discovery message and a receiving node replies back to the source node.

At some point in time after discovering second access node 104, first access node 102 determines to set up (308) a communication session with the second access node and conveys, to the second access node, a communication session initiation message. For example, the first access node may self-determine to initiate the communication session, or a user terminal or access node served by the first access node may attempt to set up a communication session via the first access node and, in response, the first access node then attempts to set up a communication session with the second access node. The communication session initiation message may include one or more of a type of communication session being initiated (and correspondingly indicating or implying a channel type sought to be set up) and a port number and/or medium access control (MAC) layer address assigned to the communication session by the first access node 102.

In response to receiving the communication session initiation message, second access node 104 selects (310) a security profile, from among the one or more security profiles maintained by the default security profile module 208 of the access node, for use in encrypting the communication session. The selection of a security profile from among one or more security profiles may be based on any one or more parameters that are known to both second access node 104 and, at the time first access node 102 selects a corresponding security profile, the first access node, which one or more parameters may be inferred from characteristics of the communication session being set up. As such parameters are utilized to select a security profile from among the multiple security profiles maintained by default security profile module 208, such parameters also may be referred to herein as security profile selection parameters. For example and as described in greater detail above, when default security profile module 208 of access node 104 includes multiple security profiles, the access node may select a security profile based on a value associated with each of the one or more parameters and by reference to a security profile table maintained by the default security profile module, or by execution of a security profile selection algorithm maintained by the default security profile module using the one or more security profile selection parameters.

For example, a security profile selection parameter may be a physical communication link type (that is, a type of medium that will be used, for example, Ethernet or wireless), a channel type (for example, one of multiple types of signaling or traffic channels) or channel characteristics (for example, parameters associated with frequencies, time slots, or channel coding that may be employed), or a network interface type that will be utilized by the access nodes for the communication session, an identifier associated with the physical communication link, a communication protocol that will be applied to data that is exchanged over the communication link, or endpoint identifiers, such as a port number or medium access control (MAC) layer address that will be utilized by an access node for communications between the access nodes or an access node identifier associated with either or both access nodes, such as a base station identifier, a mobile station identifier, a node FQDN (Fully Qualified Domain Name), an address, such as an Internet Protocol (IP) address, of either access node, or a subnet identifier associated with the access nodes. Each access node may discover the access node identifier associated with the other access node during the access node discovery process, or the access node identifier of the other access node may be discovered, and stored, as a result of previous communication sessions between the two nodes during which such information was exchanged, for example, as part of a set up of the previous session.

Second access node 104 then assembles and conveys (312) to first access node 102 an encrypted authentication challenge message. In one embodiment of the present invention, when only a single security profile selection parameter is used to select a default security profile from among multiple default security profile parameters, second access node 104 may encrypt the authentication challenge message based on the security profile selected at step 310. In another embodiment of the present invention, when multiple security profile selection parameters are used to select a security profile from among multiple security profiles, second access node 104 may include, in an unencrypted portion of the authentication challenge message, an indication of one or more security profile selection parameters used to select the security profile. In yet another embodiment of the present invention, second access node 104 may encrypt the authentication challenge message based on a security profile that is maintained in the default security profile module 208 of the access node and that is pre-designated for use in authentication challenges and responses, so that both the second and first access nodes 104, 102 are able to respectively encrypt and decrypt the authentication challenge message without exchanging an indication of a selection of a particular default security profile. In this last instance, the authentication challenge message may include an indication of the security profile selection parameters used to select a security profile for the communication session.

In response to receiving the encrypted authentication challenge message, first access node 102 selects (314) a default security profile by reference to default security profile module 208 of the first access node, decrypts the message based on the same security profile used by second access node 104 to encrypt the message, and authenticates the second access node. For example, when only a single security profile selection parameter is used to select a security profile from among multiple security profile parameters, both the first and second access nodes 104, 102 are able to determine a same value for this parameter (for example, a physical communication link type, a network interface type, a port number or a MAC layer address assigned to the communication session by the first access node, or an access node identifier) and thus are able to select a same security profile for their communication session. In other embodiments of the present invention, first access node 102 may select a security profile for decrypting the authentication challenge message based on an indication, in the message, of one or more security profile selection parameters used by second access node 104 to select a security profile to encrypt the message, or by use of a pre-designated default security profile for use in encrypting authentication challenges and responses. First access node 102 then may authenticate the second access node by determining that the second access node has used a security profile that is recognizable by the first access node, or by any other self-authentication technique known in the art.

First access node 102 then assembles, and conveys (316) to second access node 104, an authentication response message that is encrypted by the first access node using the same security profile as used to encrypt the authentication challenge message. In response to receiving the authentication response message, second access node 104 decrypts the authentication response message based on the same security profile used by first access node 102 to encrypt the message and authenticates the first access node. For example, second access node 104 may authenticate first access node 102 by determining that the first access node has used a default security profile that is recognizable by the second access node, or by any other self-authentication technique known in the art.

After first and second access nodes 102, 104 successfully exchange the authentication challenge and response messages and authenticate each other, the first and second access nodes 102, 104 set up (318) a secure communication link between the two nodes in accordance with known techniques and using the security parameters, such as one or more encryption keys, associated with the selected security profile. Typically, such security would be provided at the data link layer, although one of ordinary skill in the art realizes that the present invention applies to any protocol layer that may provide encrypted communications. In response to setting up a secure communication session, first and second access nodes 102, 104 then engage (320) in an exchange of higher layer communications, such as application layer communications, using the secure communication link, and signal flow diagram 300 ends.

By maintaining one or more same security profiles at each of access node 102 and 104 and using, by each access node, the security profiles to authenticate each other and to encrypt a communication session between the two access nodes 102, 104, communication system 100 provides for authentication and secure communications between the two nodes without the need for a centralized security server or other centralized control network element. When each of access nodes 102 and 104 maintains multiple security profiles, communication system 100 facilitates a selection of a same security profile at each of access nodes 102, 104 by providing for the access nodes to select a security profile of the multiple security profiles based on a security profile selection parameter known to both access nodes, which security profile selection parameter may be inferred from characteristics of the communication session being set up.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
    obtaining, by a processor at a first network node of a distributed, self-organizing network, a value of a security profile selection parameter based at least on a physical communication link type, a channel type, a channel characteristic, a network interface type, a physical communication link identifier, or an endpoint identifier;
    discovering, by a processor at a second network node of the distributed, self-organizing network, the first network node of the distributed, self-organizing network;
    selecting, by the processor at the first network node, a particular security profile that (i) is associated with the value of the security profile selection parameter in a table of one or more security profiles respectively associated with one or more security profile selection parameters and (ii) is used to encrypt a communication session that is being initiated between the first network node and the second network node of the distributed, self-organizing network, from among one or more security profiles that were stored on a memory device of the first network node before the first network node was discovered by the second network node;
    generating, by the processor at the first network node in response to selecting the particular security profile with which to encrypt the communication session that is being initiated between the first network node and the second network node, an authentication challenge message that includes (i) an encrypted portion that is encrypted based on the selected particular security profile that is associated with the value of the security profile selection parameter in the table, and (ii) an unencrypted portion that identifies the selected particular security profile that is associated with the value of the security profile selection parameter in the table;
    transmitting, by the processor at the first network node, the authentication challenge message from the first network node to the second network node; and
    in response to receiving the encrypted authentication challenge message at the second network node, decrypting, by the processor at the second network node, the authentication challenge message based on the particular security profile that was selected by the processor at the first network node, and in response, authenticating the first network node of the distributed, self-organizing network.

2. The computer-implemented method of claim 1, further comprising in response to discovering, by the processor at the second network node of the distributed, self-organizing network, the first network node of the distributed, self-organizing network, transmitting, by the processor at the second network node of the distributed, self-organizing network, a communication session initiation message to the first network node of the distributed, self-organizing network.

3. The computer-implemented method of claim 2, wherein the communication session initiation message transmitted, by the processor at the second network node, to the first network node includes one or more of: (i) a type of communication session being initiated between the second network node of the distributed, self-organizing network and the first network node of the distributed, self-organizing network, (ii) a port number assigned to the communication session, (iii) or a medium access control (MAC) layer address assigned to the communication session.

4. The computer-implemented method of claim 1, further comprising:
    receiving, by the second network node, the one or more security profiles; and
    storing, by the second network node, the received one or more security profiles.

5. The computer-implemented method of claim 1, further comprising:
    receiving, by the first network node, an authentication response to the authentication challenge message from the second network node, wherein the authentication response is encrypted based on the particular security profile that was selected by the processor at the first network node.

6. The computer-implemented method of claim 5, further comprising:
    decrypting, by the first network node, the authentication response to the authentication challenge message that was received, by the first network node, from the second network node, based on the particular security profile, and in response, authenticating the second network node.

7. The computer-implemented method of claim 6, further comprising:
    after authenticating the second network node, establishing, by the first network node, a secure communication link between the first network node and the second network node.

8. The computer-implemented method of claim 7, further comprising
    in response to establishing the secure communication link, providing, by the first network node, an application layer communication to the second network node.

9. The computer-implemented method of claim 1, wherein obtaining the value of the security profile selection parameter by the processor at the first network node comprises:
   obtaining, by the processor at the first network node of the distributed, self-organizing network, a value of a security profile selection parameter based at least on a physical communication link type.

10. The computer-implemented method of claim 1, wherein obtaining the value of the security profile selection parameter by the processor at the first network node comprises:
   obtaining, by the processor at the first network node of the distributed, self-organizing network, a value of a security profile selection parameter based at least on a characteristic of a channel to be used in a communication session between the first network node and second network node.

11. The computer-implemented method of claim 10, wherein the characteristic of the channel is associated with frequencies, time slots, or channel coding to be employed in the communication session between the first network node and second network node.

12. A system comprising:
   one or more computers and one or more storage devices storing instructions that are operable, when executed by the one or more computers, to cause the one or more computers to perform operations comprising:
      obtaining, by a processor at a first network node of a distributed, self-organizing network, a value of a security profile selection parameter based at least on a physical communication link type, a channel type, a channel characteristic, a network interface type, a physical communication link identifier, or an endpoint identifier;
      discovering, by a processor at a second network node of the distributed, self-organizing network, the first network node of the distributed, self-organizing network;
      selecting, by the processor at the first network node, a particular security profile that (i) is associated with the value of the security profile selection parameter in a table of one or more security profiles respectively associated with one or more security profile selection parameters and (ii) is used to encrypt a communication session that is being initiated between the first network node and the second network node of the distributed, self-organizing network, from among one or more security profiles that were stored on a memory device of the first network node before the first network node was discovered by the second network node;
      generating, by the processor at the first network node in response to selecting the particular security profile with which to encrypt the communication session that is being initiated between the first network node and the second network node, an authentication challenge message that includes (i) an encrypted portion that is encrypted based on the selected particular security profile that is associated with the value of the security profile selection parameter in the table, and (ii) an unencrypted portion that identifies the selected particular security profile that is associated with the value of the security profile selection parameter in the table;
      transmitting, by the processor at the first network node, the authentication challenge message from the first network node to the second network node; and
      in response to receiving the encrypted authentication challenge message at the second network node, decrypting, by the processor at the second network node, the authentication challenge message based on the particular security profile that was selected by the processor at the first network node, and in response, authenticating the first network node of the distributed, self-organizing network.

13. The system of claim 12, the operations further comprising:
   receiving, by the first network node, an authentication response to the authentication challenge message from the second network node, wherein the authentication response is encrypted based on the particular security profile that was selected by the processor at the first network node.

14. The system of claim 13, the operations further comprising:
   decrypting, by the first network node, the authentication response to the authentication challenge message that was received, by the first network node, from the second network node, based on the particular security profile, and in response, authenticating the second network node.

15. The system of claim 14, the operations further comprising:
   after authenticating the second network node, establishing, by the first network node, a secure communication link between the first network node and the second network node.

16. A non-transitory computer-readable medium storing software comprising instructions executable by one or more computers which, upon such execution, cause the one or more computers to perform operations comprising:
   obtaining, by a processor at a first network node of a distributed, self-organizing network, a value of a security profile selection parameter based at least on a physical communication link type, a channel type, a channel characteristic, a network interface type, a physical communication link identifier, or an endpoint identifier;
   discovering, by a processor at a second network node of the distributed, self-organizing network, the first network node of the distributed, self-organizing network;
   selecting, by the processor at the first network node, a particular security profile that (i) is associated with the value of the security profile selection parameter in a table of one or more security profiles respectively associated with one or more security profile selection parameters and (ii) is used to encrypt a communication session that is being initiated between the first network node and the second network node of the distributed, self-organizing network, from among one or more security profiles that were stored on a memory device of the first network node before the first network node was discovered by the second network node;
   generating, by the processor at the first network node in response to selecting the particular security profile with which to encrypt the communication session that is being initiated between the first network node and the second network node, an authentication challenge message that includes (i) an encrypted portion that is encrypted based on the selected particular security profile that is associated with the value of the security profile selection parameter in the table, and (ii) an unencrypted portion that identifies the selected particular security profile that is associated with the value of the security profile selection parameter in the table;

transmitting, by the processor at the first network node, the authentication challenge message from the first network node to the second network node; and in response to receiving the encrypted authentication challenge message at the second network node, decrypting, by the processor at the second network node, the authentication challenge message based on the particular security profile that was selected by the processor at the first network node, and in response, authenticating the first network node of the distributed, self-organizing network.

17. The non-transitory computer-readable medium of claim 16, the operations further comprising:

receiving, by the first network node, an authentication response to the authentication challenge message from the second network node, wherein the authentication response is encrypted based on the particular security profile that was selected by the processor at the first network node.

18. The non-transitory computer-readable medium of claim 17, the operations further comprising:

decrypting, by the first network node, the authentication response to the authentication challenge message that was received, by the first network node, from the second network node, based on the particular security profile, and in response, authenticating the second network node.

19. The non-transitory computer-readable medium of claim 18, further comprising:

after authenticating the second network node, establishing, by the first network node, a secure communication link between the first network node and the second network node.

20. The non-transitory computer-readable medium of claim 19, further comprising in response to establishing the secure communication link, providing, by the first network node, an application layer communication to the second network node.

* * * * *